United States Patent
Mahant-Shetti

(10) Patent No.: US 6,954,231 B2
(45) Date of Patent: Oct. 11, 2005

(54) CMOS SENSOR CAMERA WITH ON-CHIP IMAGE COMPRESSION

(75) Inventor: Shivaling S. Mahant-Shetti, Garland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 807 days.

(21) Appl. No.: 10/022,995

(22) Filed: Dec. 17, 2001

(65) Prior Publication Data

US 2002/0085110 A1 Jul. 4, 2002

Related U.S. Application Data

(62) Division of application No. 09/073,370, filed on May 5, 1998, now Pat. No. 6,417,882.

(51) Int. Cl.$^7$ ................................................. H04N 3/14
(52) U.S. Cl. ........................................................ 348/312
(58) Field of Search .................... 348/294, 301, 348/302, 308, 312; 708/820, 821; 257/222; 341/155; 250/208.1

(56) References Cited

U.S. PATENT DOCUMENTS

| 5,841,126 A | * 11/1998 | Fossum et al. | 250/208.1 |
| 5,886,659 A | * 3/1999 | Pain et al. | 341/155 |
| 5,920,274 A | * 7/1999 | Gowda et al. | 341/155 |
| 6,433,822 B1 | * 8/2002 | Clark et al. | 348/308 |
| 6,665,012 B1 | * 12/2003 | Yang et al. | 348/308 |

* cited by examiner

*Primary Examiner*—Wendy R. Garber
*Assistant Examiner*—Luong T. Nguyen
(74) *Attorney, Agent, or Firm*—Robert D. Marshall, Jr.; W. James Brady, III; Frederick J. Telecky, Jr.

(57) ABSTRACT

A digital camera (10) that has an array (11) of CMOS sensor elements (11a). The array (11) is read in a manner that performs spatial-to-frequency transforms for image compression on the analog output signals of the sensor elements. More specifically, wordlines (12) and bitlines (13) are pulse-width modulated so that the coincidence of their "on" times corresponds to a desired coefficient of the basis function of the transform (FIGS. 3 and 4). Additional comparator circuitry (15), quantizers (16), and encoding circuitry (19) can be part of the same integrated circuit as the array (11).

7 Claims, 3 Drawing Sheets

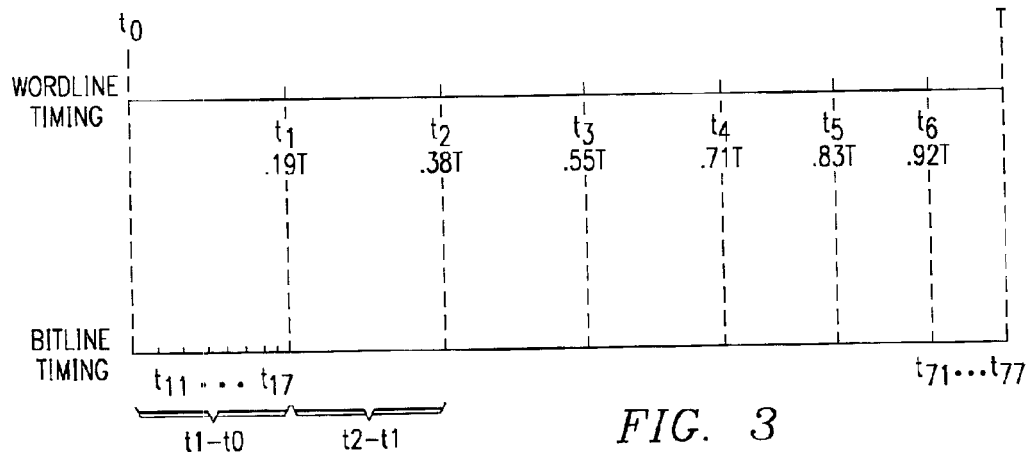
FIG. 3
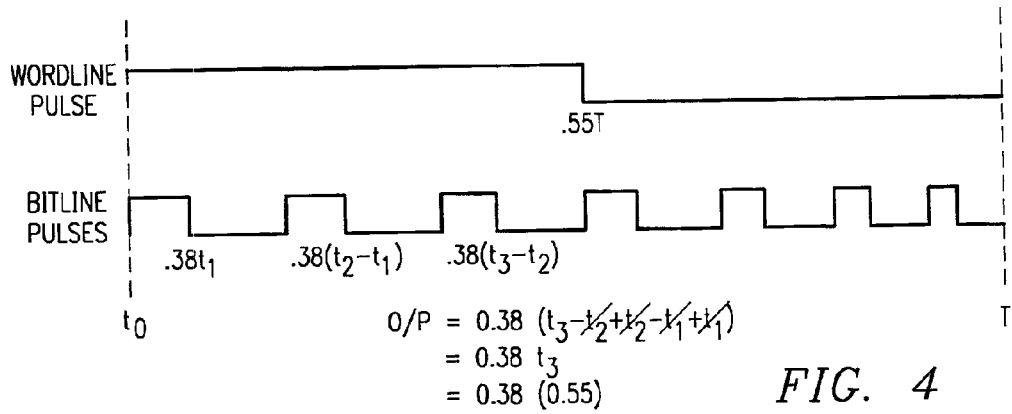
FIG. 4
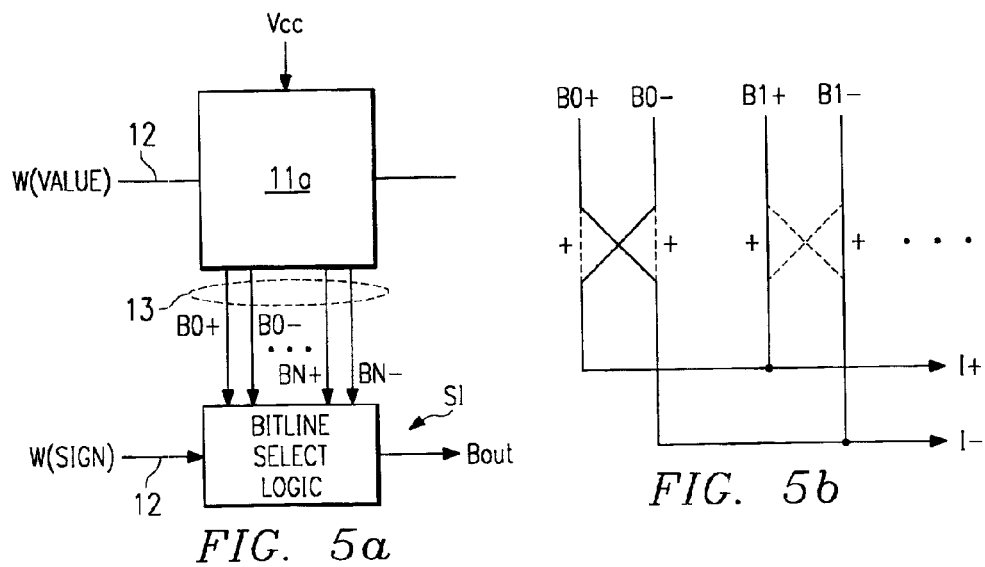
FIG. 5a
FIG. 5b

CMOS SENSOR CAMERA WITH ON-CHIP IMAGE COMPRESSION

This is a division of application Ser. No. 09/073,370, filed May 5, 1998 now U.S. Pat. No. 6,417,882.

TECHNICAL FIELD OF THE INVENTION

The present invention relates generally to image acquisition and processing, and more specifically, to a method and apparatus operable to acquire an image as well as to perform image compression tasks.

BACKGROUND OF THE INVENTION

Today, digital image acquisition has two approaches. The first, based on charge coupled device (CCD) sensors, dominates the consumer market. The second approach is based on CMOS photoreceptor sensors.

The process used to fabricate CCD sensors limits their integration with clock drivers, A/D converters, or image processing circuits. As a result, multiple chips are required to complete systems that use CCD sensors.

On the other hand, the CMOS sensor technology enables integrated circuits to be built that contain the sensor array as well as circuitry for analog-to-digital conversion, image processing, and other still and video image processing.

Often, digitized images are compressed in order to store the data or to transmit the data over a telecommunications channel. There is a considerable amount of redundancy in a typical image, and often lossy compression, which suppresses some of the less noticeable components of the image, is used. In a typical image acquisition system, a CCD camera is followed by an A/D converter and then an expensive compression chip compresses the data. Compression may also be necessary to meet bandwidth requirements of a computer system.

SUMMARY OF THE INVENTION

One aspect of the invention is a method of using a CMOS sensor array to perform a spatial to frequency transform of analog output signals from sensor elements of the array. With a CMOS sensor array, a set of wordlines and bitlines allows random access as with an SRAM.

With conventional systems based on CMOS sensor arrays, only one wordline and one set of bitlines of the CMOS sensor array is active at any given time. Using other system components, the signal on the bitline corresponding to the selected sensor element is amplified and converted to the digital domain. To convert the sensor output to the frequency domain, the output of a block (typically 8×8) of sensor elements must be multiplied by coefficients corresponding to a compression basis function and summed.

In the method of the present invention, the CMOS sensor array is read by activating wordlines and bitlines simultaneously. Pulse width modulation of the activation signals is used to impress coefficients along wordlines and bitlines. Current contributions are summed at the output of the array, thereby deriving an analog representation of a frequency domain value.

More specifically, to implement the method, the wordline activation period is divided into intervals, such that each interval has an accumulated pulsewidth whose proportion of the total period corresponds to a coefficient of the basis function. The bitline period activation period is divided into the same intervals, and each interval is further divided into subintervals, such that each subinterval has an accumulated pulsewidth whose proportion of the total period corresponds to a coefficient of the basis function. The result is the availability of pulsewidth modulated wordline and bitline signals.

In operation, a pulse is applied to at least one wordline and pulses are applied to at least one bitline. For any sensor element, its net current is determined by the coincidence of "on" times of its wordline and bitline. The number of wordlines and bitlines that can be simultaneously activated is related to the extent to which the matrix representing the coefficients of the basis function can be arranged such that rows and/or columns contain the same coefficient. Sensor outputs are obtained by activating wordlines and bitlines until the entire array is represented by its frequency components.

An additional feature of the invention is that the outputs of the sensor array may be compared to threshold values and only nonzero values converted to digital form. This conditional digitization can be performed "on-chip" and combined with quantization. Additional on-chip circuitry can be provided to perform run length or variable length encoding.

An advantage of the invention is that image sensing and image processing can be integrated—a single integrated circuit can perform both image acquisition and compression tasks. The analog transform is inherent in the readout of the sensor element outputs, and permits the digitization of only nonzero frequency components of the image. The result is a significant reduction in power requirements, as compared to transform devices that perform analog to digital conversion prior to the transform.

BRIEF DESCRIPTION OF THE DRAWINGS

FIG. 3 illustrates pulsewidth modulation of wordline and bitline activation periods.

FIG. 4 illustrates how a DCT frequency output is obtained from a single sensor element.

FIGS. 5a and 5b illustrate how a sensor element may be configured to provide both positive and negative output signals.

DETAILED DESCRIPTION OF THE INVENTION

Figure 1:
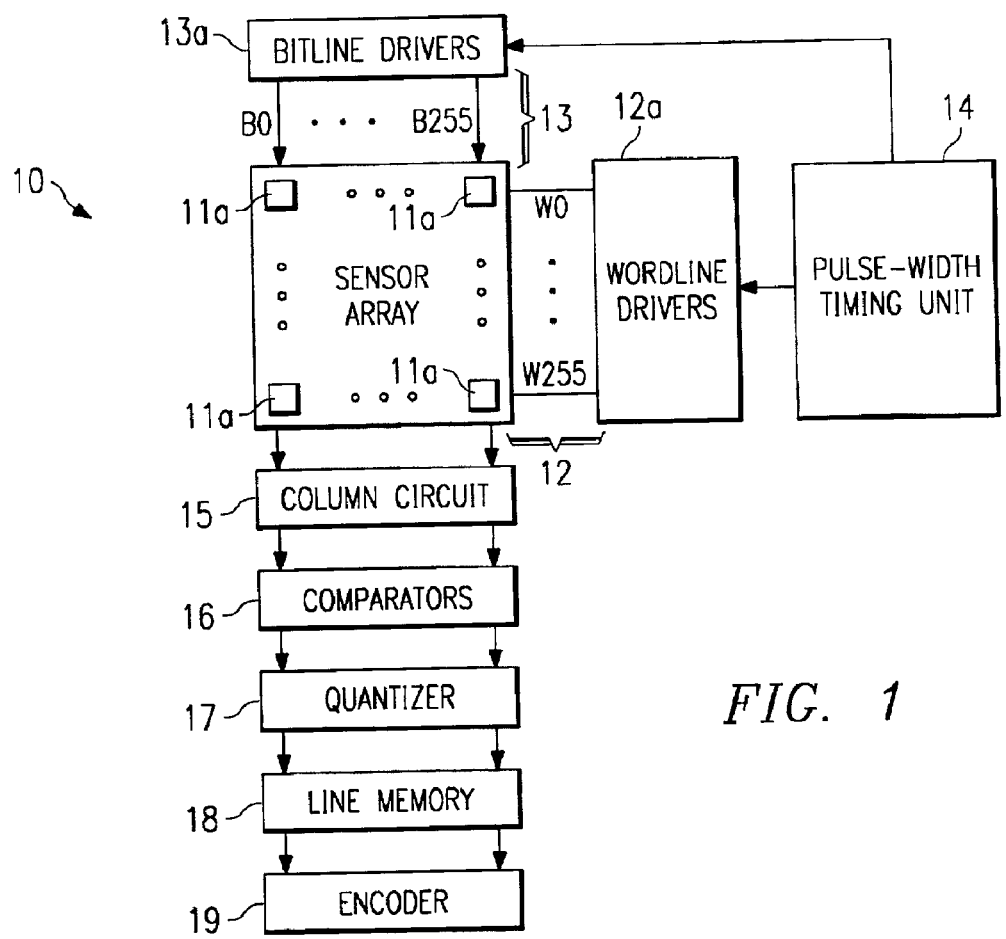
FIG. 1 illustrates a camera 10 in accordance with the invention, which is fabricated using CMOS integrated circuit technology.

FIG. 1 illustrates a camera 10 in accordance with the invention, referred to herein as a "silicon transform camera". The basic elements of camera 10 comprise a sensor array 11, column circuitry 15, comparators 16, quantizers 17, line memory 18, and encoder 19. Sensor array 11 has associated wordlines 12, bitlines 13, wordline drivers 12a, and bitline drivers 13a. A pulsewidth timing unit 14 either generates or stores timing patterns used for activating the wordlines and bitlines.

Camera 10 is fabricated with CMOS technology, and may be fabricated as a single integrated circuit. Thus, camera 10 is representative of solid state image sensor technology and may be referred to as a "camera on a chip". However, the fabrication of the elements of camera 10 as a single integrated circuit is a design choice. Thus, if desired, camera 10 could be fabricated as two or more integrated circuits having appropriate interconnections for data and control signals.

As explained below, camera 10 not only acquires an image but also performs image compression. As illustrated in FIG. 1, camera 10 performs all compression tasks, that is, a spatial-to-frequency domain transform, quantization, and run length or variable length encoding. In most of the following examples of this description, the spatial-to-frequency domain transform is consistent with MPEG standards. Thus, the transform is a discrete cosine transform (DCT) and is performed with respect to 8×8 blocks of sensor elements. However, as is also explained below, the transform may be performed according to a discrete articulated trapezoid transform (DATT). In general, the invention is useful for any compression method that involves multiplying sensor outputs by a separable matrix of transform coefficients, regardless of the particular transform algorithm or block size.

The general principle of image compression is to reduce the high spatial redundancy of a typical image by transforming a signal representing the image in the spatial domain to a signal representing the image in the frequency domain. Then, the high spatial frequency components can be coded to a form that is expressed with less data. Conventionally, the transform is performed on image data that is already in digital form.

An important feature of the invention is that sensor array 11 performs both image acquisition and spatial-to-frequency domain transforms, with the transform being performed on analog signals. More specifically, the manner in which sensor array 11 is structured with X-Y readout (wordlines 12 and bitlines 13) permits it to be addressed and read in a manner that transforms the analog outputs of its sensor elements from the spatial to the frequency domain.

In the example of this description, sensor array 11 has 256×256 sensor elements 11*a*. It is assumed that array 10 is a CMOS sensor array, having sensor elements 11*a* similar to those described in the Background but designed to operate in accordance with the present invention. Although not specifically shown in FIG. 1, the components of a suitable sensor element 11*a* comprise a photodiode and appropriate transistors to amplify the signal from the diode. Each sensor element 11*a* is an "active" sensor, in that it further comprises a readout amplifier. Each sensor element 11*a* generates a current that is proportional to the intensity of illumination sensed by that sensor element 11*a*. A typical size of array 11 might be 0.25×0.25 centimeters, each sensor element 11*a* being about 10×10 microns.

The sensor elements 11*a* of array 11 are read out over a matrix of X-Y lines connected to peripheral driver circuits. In this sense, array 11 is random access, that is, its sensor elements 11*a* are addressable by row and column. In the example of this description, the X lines are wordlines 12 and the Y lines are bitlines 13. Wordline drivers 14 and bitline drivers 15 drive the wordlines 12 and bitlines 13, respectively.

Each row of sensor elements 11*a* has an associated wordline 12. Each column of sensor elements 11*a* has an associated bitline 13. As explained below in connection with FIG. 4, sensor elements 11*a* can be configured to generate both positive or negative transform values by means of a differential readout scheme and bifurcated bitlines 13. As an overview of the DCT transform performed by sensor array 11, the DCT transform of response signals from an 8×8 block of sensor elements 11*a* is performed by multiplying the signals by basis function values and summing the results, as required by DCT. The basic operation may be expressed as:

$$f_{ij} = \Sigma I_{ij} C_{ij}$$

where $i=0 \ldots 7$ and $j=0 \ldots 7$ and leading constant values have been ignored. Each $I_{ij}$ represents the output of a sensor element 11*a* and the spatial domain input to the DCT transform. Each $C_{ij}$ represents a multiplier from the DCT basis function. The resulting $f_{ij}$ is a signal representing the frequency domain output. For an 8×8 block of sensor elements 11*a*, each $F_{ij}$ output is the sum of 64 multiplications. The entire block of 64 sensor elements produces 64 frequency components, $F_{ij}$.

A characteristic of DCT is that it is a separable transform. Thus, it may be implemented with two one-dimensional transforms. Expressed mathematically, $$C_{ij} = C_i C_j$$

and $$f_{ij} = \Sigma\Sigma I_{ij} C_i C_j$$

As implemented in the present invention and as explained below, DCT separability permits each signal from a sensor element, $I_{ij}$, to be multiplied by a row-wise factor and a column-wise factor.

Figure 2:
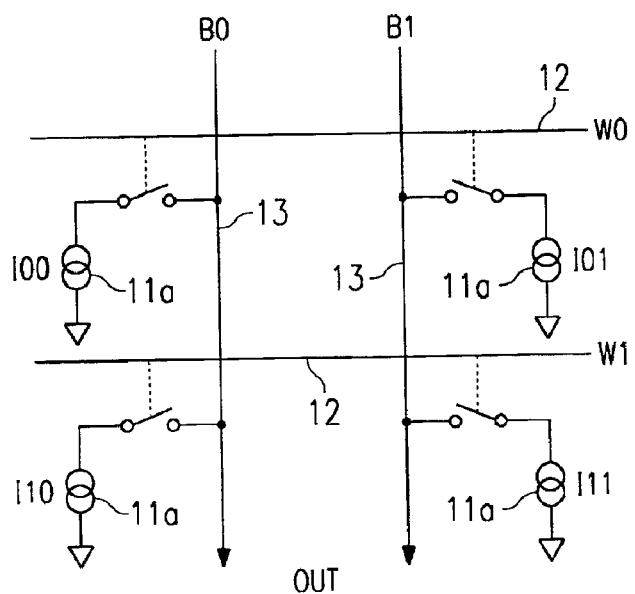
FIG. 2 illustrates a 2×2 block of sensor elements of the sensor array of FIG. 1.

FIG. 2 illustrates a 2×2 block of sensor elements 11*a*, in other words, a portion of array 11. Although DCT transforms are typically performed on 8×8 blocks of sensor elements, for purposes of description herein, a 2×2 block is more easily understood. The same concepts are easily extended to larger blocks. The sensor elements 11*a* are identified in terms of their output currents: I00, I01, I10, and I11. Each sensor element 11*a* has an associated bitline, B0 or B1, and an associated wordline, W0 or W1.

Current from a particular sensor element, $I_{ij}$, is available on a bitline 13 when both its associated wordline 12 and bitline 13 are activated. The length of time that the current is available on the bitline 13 is controlled by pulsewidth modulation of wordline and bitline activation periods. The modulation scheme is determined by the particular transform algorithm being implemented.

FIG. 3 illustrates a pulsewidth modulation scheme for DCT. Consistent with DCT, pulsewidths are determined by basis function values of cos(n*11.25), where n is an integer. To reduce pulsewidth variation, cos(1*11.25)=0.981 is approximated to cos(0*11.25)=1. As a result, n=1,2, . . . 7.

For pulsewidth modulation of wordline activation periods, the total time, T, that a wordline 12 may be active is divided into n intervals. Each interval has an accumulated duration that is proportional to the total activation period, T, by a cosine value of the basis function. Thus, a first interval, t1, is equal to 0.19T, the next interval, t2, is equal to 0.38T, etc. The nth interval, t7, is assumed to be equal to T.

The accumulated duration of any wordline interval is a pulsewidth that is available for activating a wordline 12. Consistent with the graphical illustration of FIG. 3, the following table illustrates the available wordline pulse widths.

t1=0.19T
t2=0.38T
t3=0.55T
t4=0.71T
t5=0.83T
t6=0.92T
t7=T

For bitline pulsewidth modulation, each interval of the wordline activation period is divided into n subintervals.

These subintervals also correspond to the basis function values of $\cos(n*11.25)$. Thus, a first interval (t1–t0) has seven subintervals, with a first subinterval, t11, equal to 0.19t1, a second subinterval, t12, equal to 0.38t1, etc. The next interval (t2–t1) is similarly divided into subintervals, such that t21=0.19 (t2–t1), t22=0.38(t2–t1), ... t27=(t2–t1). The full wordline activation period, T, is divided in this manner. Each bitline subinterval is a pulsewidth that is available for activating a bitline 13. A bitline 13 is pulsed repeatedly during T, once during each interval.

FIG. 4 illustrates an example of obtaining a particular DCT output value from a single sensor element 11a of array 11. The desired multiplication for the sensor element is 0.55*0.38. This multiplication corresponds to the separable multiplication of basis function values, expressed above as $C_i*C_j$. The wordline corresponding to the row in which the sensor element is located is "on" for a pulse width of t3=0.55T. During the wordline activation period, the bitline is pulsed at every interval for 0.38 of that interval. The pulses at t12=0.38t1, t22=0.38(t2–t1), and t32=0.38(t3–t2) provide a total charge sink from the sensor element. The pulses at t42, t52, and t62 are blocked by the "off" state of the wordline. Thus, the "on" time for the sensor element is determined by the coincidence of the wordline and bitline pulses. The sum of the three effective pulses is 0.38(t3–t2+t2–t1+t1), which is equivalent to 0.38*t3 as required. In other words, the coincidence of the pulsewidths has a duration that corresponds to a product of basis function coefficients. Each coefficient is a separable coefficient, Ci or Cj, of the basis function.

It is therefore possible to multiply the current from each sensor element 11a by two transform coefficients. The operation may be expressed mathematically as:

$$F_{ij}=\cos(n*11.25)*\cos(m*11.25)$$

For obtaining signed (positive or negative values), each wordline is actually bifurcated (comprised of a positive and negative line), with the appropriate line being activated for the desired sign of the output. Each sensor element 11a has a differential transistor arrangement so that the appropriate bitline is activated. Each column provides its current sink, which corresponds to either I+ and I–.

FIG. 5a illustrates the general structure of a sensor element 11a for providing signed frequency components. The wordline 12 provides a signal indicating sign as well as provides the pulsewidth. Appropriate logic may be added at the column output to recognize sign changes, as shown in FIG. 5b.

Sensor elements 11a on the same wordline 12 can provide output in parallel if they all have a common coefficient. A sensor element on the same wordline but a different bitline will be provided a different bitline pulse and will provide a different amount of charge. Thus, for any sensor element on the same wordline as the above example, where the wordline remains on for t3=0.55T, the charge provided by that sensor element is (t3–t2+t2–t1+t1) *cos(n*11.25)=t3*cos (n*11.25). Another sensor element on the same bitline but on a different wordline will provide charge during a different time interval T, with different wordline and bitline pulses. As explained below in connection with FIG. 6, the arrangement of the basis function factors, Ci and Cj, determines the extent to which the transform of the output of the entire array 11 can be parallelized.

At the bottom of each set of 8 columns, a net amount of charge accumulates down the associated bitline. These charges are summed to result in the net amount of charge from array 11. Column circuitry 15 is comprised of capacitors used to accumulate and sum charge. When integrated, this charge provides the dc equivalent of a DCT coefficient, which is to be converted to a digital word.

Typically, 8 of the 256 wordlines are pulsed and all 32 blocks of 8 bitlines each are pulsed. The resulting current pulse for each block are summed with a capacitor and converted to a digital word. Thus, during one timing interval, T, one frequency domain component per block (32 total) is generated. It is possible to have these 32 components correspond to different locations in the frequency domain as long as their row value remains the same. Using different column and row timings, each block is addressed 64 times to derive all the frequency domain coefficients.

Figure 6:
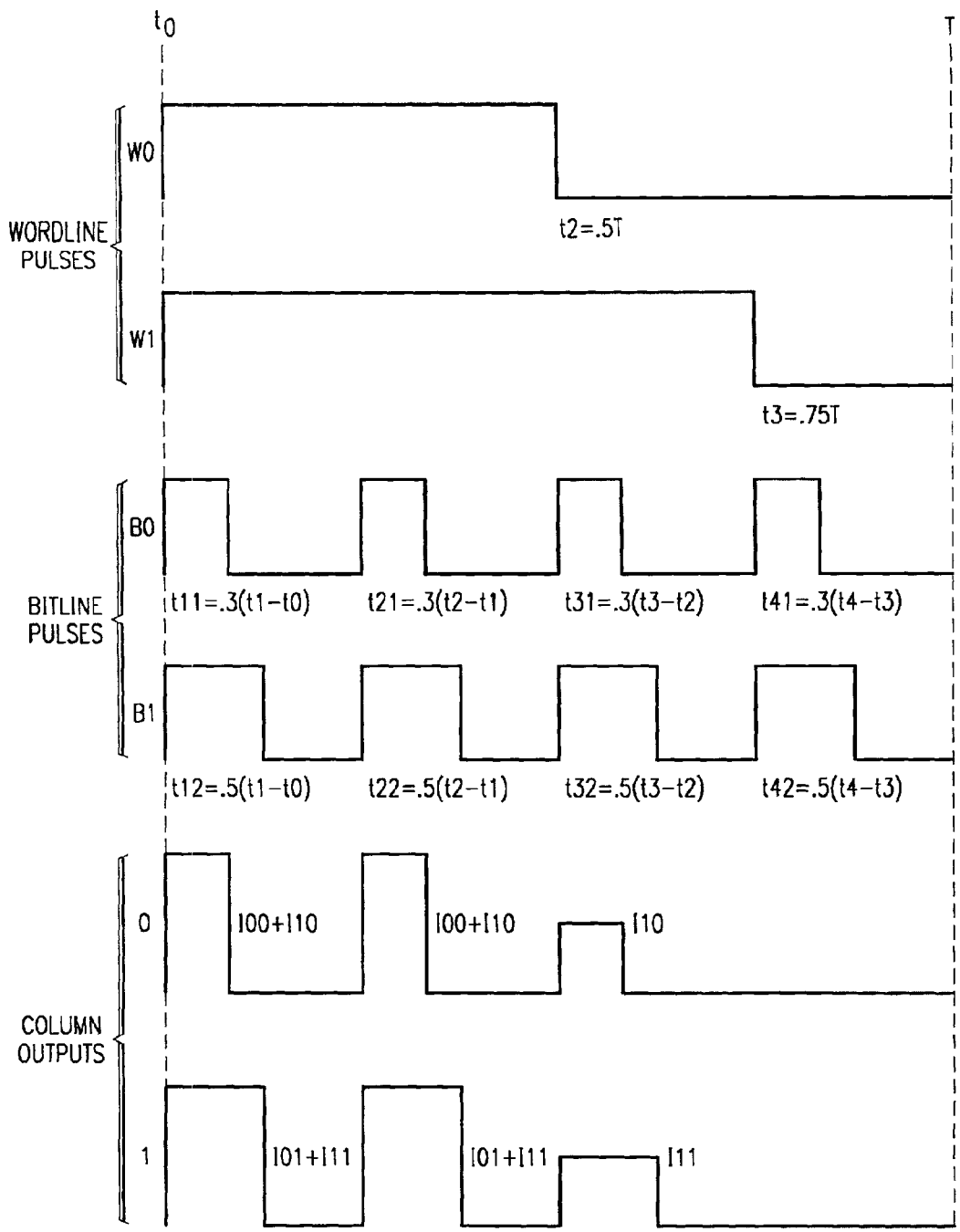
FIG. 6 illustrates how a single output value may be obtained by simultaneously activating multiple wordlines and multiple bitlines.

FIG. 6 illustrates how a 2×2 block of sensor elements, such as the 2×2 block of FIG. 2, can be activated to provide a single output value during a single time, T. In FIG. 6, the pulsewidth modulation scheme is different from that of FIG. 4, with the pulsewidths not necessarily those associated with DCT transforms. This illustrates the fact that the invention is not limited to any particular transform, but is applicable whenever the sensor output is to be multiplied by of matrix of separable coefficients, Ci and Cj. In FIG. 6, as in FIG. 2, the activation period, T, is divided into intervals for purposes of wordline activation, and these intervals are divided into subintervals for purposes of bitline activation. Here, the are four intervals of equal duration. Thus, the available wordline pulsewidths are 0.25T, 0.5T, 0.75T and T. The available bitline subintervals are multiples of the wordline intervals by factors of 0.3, 0.5 and 1.0. Thus, during each wordline interval, the bitline may be pulsed for a duration of 0.3, 0.5, or for all of that interval.

To obtain an output from the 2×2 array, both wordlines and both bitlines are simultaneously activated. The wordline pulse on W0 is 0.5T and the wordline pulse on W1 is 0.75T. The bitlines are pulsed four times, once during each wordline interval. The pulsewidths on B0 are 0.3 of each interval and the pulsewidths on B1 are 0.5 of each interval.

The output from each column, C0 and C1, is the sum of the output from the sensor elements on that column. If a wordline is not "on", a bitline pulse has no effect on the output. The output from any sensor element is determined by the coincidence of pulsewidths on its wordline and bitline. The output from a column is determined by the sum of outputs on the bitline for that column.

Thus, for column C0, the first two pulses on B0 provide 0.3(0.25)T of the output from each sensor element. The third pulse on B0 provides 0.3(25)T from only the sensor element on W1. Expressed mathematically:

$$IC0=(2*(i00+i10)+i10)\ (0.3*0.25T)$$

Likewise, the output of C1 may be expressed as:

$$IC1=(2*(i01+i11)+i11)\ (0.5*0.25T)$$

The sum of these outputs may be expressed as:

$$IOUT=IC0+IC1$$

This sum can be divided by some value to provide the desired output, Fij. Any "division", that is, any Fij/x, can be implemented with the gain associated with A/D conversion.

The technique illustrated in FIG. 6 can be extended to provide the frequency component, Fij, for an 8×8 block of sensor elements. Eight wordlines are activated for each 8×8 block.

By broadcasting the wordlines over the full sensor array 11, 32 blocks could be read simultaneously. Further parallelization could be accomplished by partitioning the array 11 into a top and a bottom partition and accumulating charge at the top and at the bottom of the array 11. With a 256×256 array 32-block parallelization, 32 sets of 8 outputs are simultaneously available.

For a given transform of the output of array 11, the number of sensor elements and the transform coefficients provided by the transform is the same. Thus, to provide 60 frames per second (16.7 microseconds per frame) a 256×256 array with 32-block parallelism would require a time per transform coefficient of 32/(256*256*60)=8.138 microseconds. For DCT transforms, this permits the smallest bitline pulse to be 294 nanoseconds (8.138*0.19*0.19=0.294). If each sensor element were to provide 10 nA, the net charge from 64 sensor elements operating for 8.14 microseconds would be 188 fc.

Referring again to FIG. 1, the pulsewidth modulation timing can be stored in a timing unit 14. Various timing patterns may be predetermined and stored or generated "on the fly".

After an analog signal representing a frequency component, Fij, is obtained from a block of sensor elements 11a, the signal is digitized and encoded. A characteristic of DCT is that a large number of DCT coefficients are zero. These zero values are detected as an initial step of A/D conversion so that further conversion can be halted. This is accomplished with comparators 16. If the signal is greater than zero (or some other threshold), it is delivered to A/D converters 17. For negative frequency components, the comparators 16 look for values less than 0 (or some other threshold). Consistent with DCT, the result is a compression ratio that is approximately the number of frequency components (64 per block) divided by the number of non-zero components.

A/D conversion of values that exceed the threshold values is performed by quantizers 17. The gains of quantizers 17 can be set to include different quantization slopes for different coefficients.

The output from quantizers 17 is comprised of frequency component values with runs of zero values. These values could be delivered to an off chip encoder for run length or variable length encoding. Alternatively, as illustrated in FIG. 1, the encoding may be performed on chip. A line memory 18 stores DCT values for a row of blocks, and may be read out to encoder 19, which performs run length or variable length encoder.

Using the above-described process, streams of MPEG data can be generated for I frames directly. Depending on the readout method of the sensor elements of array 11, individual pixel values, block or line average values, or the like could be provided. The matrices of multiplications for each Fij can be arranged to optimize the resulting arrangement of small-valued outputs. Furthermore, current copiers for small currents, or replicas of the diode voltages of a previous frame, could be developed so that previous frame signals could be stored to produce differential values. Additional processing such as edge or motion detection could be provided with appropriate logic circuitry.

As stated above, the invention can be used for transforms other than DCT. Thus, an alternative method of the invention uses a discrete articulated trapezoid transform (DATT) rather than a DCT transform. A characteristic of DATT transforms is that an articulated trapezoidal waveform may be used to approximate the cosine waveform and provide for integer operations. The following table sets out the correspondence of DCT and DATT transform values.

| DCT | 10*DATT |
|---|---|
| 1.00 | 10 |
| 0.98 | 10 |
| 0.92 | 9 |
| 0.83 | 8 |
| 0.71 | 7 |
| 0.55 | 6 |
| 0.38 | 4 |
| 0.19 | 2 |
| 0.00 | 0 |

These values, rather than the cosine values set out above, would be used to divided the wordline activation period into intervals and the bitline activation period into intervals and subintervals. The DATT approximations permit a frame period of 17 microseconds for providing each transform coefficient. The wordline intervals are in multiples of 1.7 microseconds and the bitline subintervals are 170 nanoseconds.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method of providing pulsewidth modulated bitline and wordline signals for performing spatial to frequency transforms of analog signals from sensor elements of a CMOS sensor array, said transform being characterized by a basis function, comprising the steps of;

dividing a wordline period into intervals, such that each interval has an accumulated pulsewidth corresponding to a coefficient of said basis function, thereby providing a pulsewidth modulated wordline signal; and dividing a bitline period into said intervals and into subintervals, such that each subinterval of each interval has an accumulated pulsewidth corresponding to a coefficient of said basis function.

2. The method of claim 1, wherein said transform is a discrete cosine transform.

3. The method of claim 1, wherein said transform is a discrete articulated trapezoid transform.

4. The method of claim 2, wherein:

said step of dividing the wordline period into intervals includes dividing a wordline period T into eight intervals of duration Tcos(n×11.25), where n is an integer 0, 1, 2, 3, 4, 5, 6 or 7.

5. The method of claim 1, wherein:

said step of dividing the wordline period into intervals includes dividing a wordline period T into intervals t0=0, t1=0.19T, t2=0.38T, t3=0.55T, t4=0.71T, t5=0.83T, t6=0.92T, and t7=T.

6. The method of claim 5, wherein:

said step of dividing the wordline period into intervals and into subintervals includes dividing an interval t1−t0 into subintervals t11=0.19 (t1−t0), t12=0.38(t1−t0), t13=0.55(t1−t0), t14=0.71 (t1−t0), t15=0.83(t1−t0), t16=0.92(t1−t0) and t17= (t1−t0), dividing an interval t2−t1 into subintervals t21=0.19 (t2−t1), t22=0.38(t2−t1), t23=0.55(t2−t1), t24=0.71 (t2−t1), t25=0.83(t2−t1), t26=0.92(t2−t1) and t27= (t2−t1), dividing an interval t3–t2 into subintervals t31=0.19(t3–t2), t32=0.38(t3–t2), t33=0.55(t3–t2), t34=0.71((t3–t2), t35=0.83(t3–t2), t36=0.92(t3–t2), and t37=(t3–t2), dividing an interval t4–t3 into subintervals t41=0.19(t4–t3), t42=0.38(t4–t3), t43=0.55(t4–t3), t44=0.71(t4–t3), t45=0.83(t4–t3), t46=0.92(t4–t3) and t47=(t4–t3), dividing an interval t5–t4 into subintervals t51=0.19(t5–t4), t52=0.38(t5–t4), t53=0.55(t5–t4), t54=0.71(t5–t4), t55=0.83(t5–t4), t56=0.92(t5–t4) and t57=(t5–t4), dividing an interval t6–t5 into subintervals t61=0.19(t6–t5), t62=0.38(t6–t5), t63=0.55(t6–t5), t64=0.71(t6–t5), t65=0.83(t6–t5), t66=0.92(t6–t5) and t67=(t6–t5), dividing an interval t7–t6 into subintervals t71=0.19(t7–t6), t72=0.38(t7–t6), t73=0.55(t7–t6), t74=0.71(t7–t6), t75=0.83(t7–t6), t76=0.92(t7–t6) and t77=(t7–t6).

7. The method of claim 3 wherein:

said step of dividing the wordline period into intervals includes dividing a wordline period 10T into intervals t0=0, t1=2T, t2=4T, t3=6T, t4=7T, t5=8T, t6=9T, and t7=10T.

* * * * *